United States Patent
Takashige et al.

(10) Patent No.: US 6,721,159 B2
(45) Date of Patent: Apr. 13, 2004

(54) POWER FEEDING APPARATUS, TRANSPORTER AND TRANSPORT SYSTEM

(75) Inventors: Satoshi Takashige, Osaka (JP); Makoto Uehira, Osaka (JP); Shingo Koyama, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 216 days.

(21) Appl. No.: 09/943,208

(22) Filed: Aug. 31, 2001

(65) Prior Publication Data

US 2002/0057075 A1 May 16, 2002

(30) Foreign Application Priority Data

Sep. 4, 2000 (JP) .......................................... 2000-267703

(51) Int. Cl.$^7$ ................................................ G05F 1/00
(52) U.S. Cl. ......................................... 361/170; 361/103
(58) Field of Search ................................ 361/170, 103, 361/119, 124, 143, 146, 161

(56) References Cited

U.S. PATENT DOCUMENTS

| | | | | |
|---|---|---|---|---|
| 3,809,962 A | * | 5/1974 | Brown et al. ................... | 361/44 |
| 4,300,031 A | * | 11/1981 | Reboux et al. ............... | 219/617 |
| 4,554,439 A | * | 11/1985 | Cross et al. .................. | 219/497 |
| 5,991,171 A | * | 11/1999 | Cheng ........................ | 363/21.03 |
| 6,160,384 A | * | 12/2000 | Inaba et al. .................... | 322/59 |
| 6,321,067 B1 | * | 11/2001 | Suga et al. .................. | 455/41.2 |

FOREIGN PATENT DOCUMENTS

| | | |
|---|---|---|
| JP | 54-57649 B1 | 5/1979 |
| JP | 54-57650 B1 | 5/1979 |
| JP | 6-506099 A | 7/1994 |
| JP | 8-308151 A | 11/1996 |
| JP | 9-130905 A | 5/1997 |
| JP | 11-27870 B1 | 1/1999 |
| JP | A11164497 | 6/1999 |
| JP | A11164498 | 6/1999 |
| JP | 11-178104 A | 7/1999 |
| JP | 11-341713 B1 | 12/1999 |
| KR | 1998-026204 B1 | 7/1998 |

\* cited by examiner

*Primary Examiner*—Adolf D. Berhane
*Assistant Examiner*—Lawrence Luk
(74) *Attorney, Agent, or Firm*—Birch, Stewart, Kolasch & Birch, LLP

(57) ABSTRACT

In a power feeding apparatus having pickup coils L1 and L2, a rectifier circuit 4 and output terminals U and V, the relays R1 and R2 are connected between the output side terminals of the rectifier circuit 4 and the output terminals U and V. Whereas a protective circuit (switching control circuit) 6, which is connected to the pickup coils L1 and L2 and the relay coils r1 and r2 to obtain the electric power from the output side terminals of the rectifier circuit 4 in order to carry out ON/OFF control of the relays R1 and R2 corresponding to the voltage at the both ends of the pickup coils L1 and L2, is provide. The power feeding apparatus enables to prevent an overcurrent from flowing through a load, to prevent the circuit elements from being destroyed or burnt out due to an overcurrent generated in the pickup coils or an overvoltage generated in a resonance capacitor, to indicate an occurrence of an abnormality and to control the electric power supply by means of a remote control.

19 Claims, 5 Drawing Sheets

POWER FEEDING APPARATUS, TRANSPORTER AND TRANSPORT SYSTEM

BACKGROUND OF THE INVENTION

1. Field of the Invention

The present invention relates to a power feeding apparatus that prevents circuit elements from being destroyed due to an applied over load, and to a transporter and a transport system equipped with the power feeding apparatus.

2. Description of the Related Art

Conventionally, many transport systems have been realized in order to transport goods by means of transporters moving along a guide rail, and the efficiency of the transportation of goods within a plant or a warehouse has been increased. Generally, a motor is used to drive such a transporter, and the electric power is supplied to the motor via a feeder line attached along the guide rail.

As for the power feeding apparatus, there are two types, i.e., a trolley type and a non-contacting type. Because less dust is generated and less maintenance service is required, the non-contacting type power feeding apparatus system is frequently used. In the non-contacting type power feeding system, a pickup equipped to the transporter is disposed adjacent to the feeder line, and an induced electromotive force is generated on the coil by means of the electromagnetic coupling between the pickup and the feeder line to supply the electric power.

FIG. 1 is a block diagram showing a conventional non-contacting type power feeding apparatus. In the figure, reference numeral 1 denotes a pickup, which is comprised of a pickup coil L wound around a pickup core (not shown). The pickup 1 is equipped on a transporter or the like and is disposed adjacent to the feeder line 9 connected to an electric power source 11. The feeder line 9 is laid along a guide rail (not shown) or the like disposed within a plant. The transporter is movable along the guide rail. Connected in parallel to the pickup coil L are a resonance capacitor C and a rectifier circuit 4. The resonance circuit 2 is comprised of the coil L and the resonance capacitor C. The output terminals of the rectifier circuit 4 are connected to the input terminals of a constant voltage circuit 40, and the output terminals of the constant voltage circuit 40 become the output terminals U and V of the non-contacting type power feeding apparatus, and at the output terminals U and V, the driving unit of the transporter is connected thereto.

In the non-contacting type power feeding apparatus structured as described above, when AC electric power is supplied to the feeder line 9 connected to the electric power source 11, induced electromotive force is generated on the pickup coil L. The induced electromotive force is resonated in the resonance circuit 2 to obtain maximum electric power, and further, rectified in the rectifier circuit 4, converted into electric power having constant voltage characteristic by the constant voltage circuit 40 and outputted from the output terminals U and V. The electric power outputted from the output terminals U and V is supplied to the driving unit of a transporter or the like (not shown) and the transporter is driven thereby.

In the non-contacting type power feeding apparatus described above, when the rectifier circuit 4 or the constant voltage circuit 40 is opened, or in case the load 10 has an inverter and when the circuit is short circuited, an overcurrent flows through the pickup coil L and resonates resulting in generation of an overvoltage on the resonance capacitor C. Accordingly, there is a danger that circuit elements may be destroyed or burnt out due to overheat. Accordingly, in order that a service person carries out an inspection and repair service on a point in which the abnormality has occurred, it is necessary to shut down the electric power source 11 even when the other non-contacting type power feeding apparatuses are normal.

As described above, in the conventional non-contacting type power feeding apparatus, when an overcurrent flows through the pickup coil L and resonates, there is a danger that circuit elements may be destroyed or burnt out due to an overvoltage generated on the resonance capacitor C. In order to solve this problem, a non-contacting type power feeding apparatus is disclosed in Japanese Patent Application Laid-Open No. 11-164497 (1999). In the above-mentioned non-contacting type power feeding apparatus, a thermo-responsive mechanical latch relay having a heat-sensing device installed adjacent to the pickup coil L and a contact provided between the both ends of the pickup coil L or between the output terminals of the rectifier circuit 4, which maintains the contacting state even when the electric power supply is discontinued, is provided. When the temperature of the pickup coil L exceeds a predetermined temperature, the contact of the mechanical latch relay is closed to establish a short circuit between the both ends of the pickup coil L or between the output terminals of the rectifier circuit 4 so that the circuit elements are prevented from being destroyed or burnt out.

According to the non-contacting type power feeding apparatus disclosed in Japanese Patent Application Laid-Open No. 11-164498 (1999), when an abnormality has occurred, even when a service person has not completed the inspection and repair service yet, but when the temperature of the pickup coil L decreases lower than the predetermined value, since the contact of the thermostat opens automatically to return to the original position, there is a danger that the service person may get an electric shock, and also, abnormalities due to the identical cause may be repeated.

In order to solve the troublesomeness and danger residing in the latch-releasing service of the above-mentioned mechanical latch relay, a non-contacting type power feeding apparatus is disclosed in Japanese Patent Application Laid-Open No. 11-164498 (1999). In the above-mentioned non-contacting type power feeding apparatus, a thermostat having a contact between the both ends of the pickup coil L or between the output terminals of the rectifier circuit 4, and a heat-sensing device adjacent to the pickup coil L is provided. When the temperature of the pickup coil L exceeds a predetermined value, the contact is closed to prevent the circuit elements from being destroyed, and when the temperature decreases lower than the predetermined value, the contact opens automatically to restart supplying the electric power.

According to the non-contacting type power feeding apparatus disclosed in Japanese Patent Application Laid-Open No. 11-164498 (1999), when am abnormality has occurred, even when a service person has not completed the inspection and repair service yet, but when the temperature of the pickup coil L decreases lower than the predetermined value, since the contact of the thermostat opens automatically to return to the original position, there is a danger that the service person may get an electric shock, and also, abnormalities due to the identical cause may be repeated.

BRIEF SUMMARY OF THE INVENTION

The present invention has been made to solve the above-described problems. Accordingly, it is an object of the invention to provide a power feeding apparatus equipped with a switching element connected between the output side terminals of a rectifier circuit and the output terminals of the power feeding apparatus, which becomes into a discontinuous state when an overvoltage exceeding a predetermined value has occurred at the both ends of the pickup coils due to a short circuit of a load or the like. Accordingly, the power feeding apparatus according to the invention enables to prevent an overcurrent from flowing through the load, and enables to prevent the circuit elements from being destroyed or burnt out due to an overcurrent generated in the pickup coils or an overvoltage generated in the resonance capacitor. Further, the power feeding apparatus according to the invention enables to make the switching element to become into a discontinuous state without any delay at an occurrence of instantaneous overvoltage.

Further, since the above-mentioned switching circuit is structured so that the electric power is fed from the output side terminals of the rectifier circuit, it is possible to provide a power feeding apparatus that enables to receive the electric power even when the switching element has become into a discontinuous state at an occurrence of an abnormality, and enables the non-contacting type power feeding apparatus itself to indicate an alarm of the abnormality even when an abnormality has occurred.

Furthermore, in addition to the above, it is another object of the invention to provide a power feeding apparatus in which the above-mentioned switching control circuit is equipped with a communication unit enabling the switching element to maintain the discontinuous state and to be controlled by means of a remote control to avoid a danger accompanying the releasing service of the switching element and a danger of a service person due to automatic resetting of the switching element.

Still further, it is another object of the invention to provide a power feeding apparatus in which a temperature sensor connected to the above-mentioned switching control circuit is provided adjacent to the pickup coils, which enables the switching element to become into a discontinuous state to prevent the circuit elements from being destroyed or burnt out even when the voltage at the both ends of the pickup coils is lower than a predetermined value, in case the temperature of the pickup coils exceeds a predetermined value due to a temperature rise around the pickup coils or an increase of the electric power or the like.

Still furthermore, it is another object of the invention to provide a power feeding apparatus in which a fuse is provided at the connecting point between the pickup coils and the switching control circuit so that the fuse is opened to prevent the circuit elements from being destroyed due to an applied overcurrent or overvoltage even when an abnormality has occurred in the switching control circuit, the switching element has become into uncontrollable and an overcurrent has flowed through the circuit elements.

Further again, it is another object of the invention to provide a transporter equipped with the above-mentioned power feeding apparatus that enables to respond to an abnormality occurred while the power is supplied and to provide a stable drive, and a transport system that includes the above-mentioned transporter and a feeder line for supplying the electric power to the power feeding apparatus mounted on the transporter to provide a stable drive.

A power feeding apparatus according to the first invention is a power feeding apparatus, comprising: pickup coils for generating induced electromotive force; a rectifier circuit for rectifying the induced electromotive force generated on the pickup coils; output terminals for outputting the output electric power from the rectifier circuit; a switching element connected between the output terminals of the rectifier circuit and the output terminal; and a switching control circuit connected to the pickup coils and the switching element for carrying out ON/OFF control of the switching element corresponding to the voltage at the both ends of the pickup coils by obtaining the electric power from the output side terminals of the rectifier circuit.

A power feeding apparatus according to the second invention is a power feeding apparatus as described in the first invention, further comprising a temperature sensor connected to the switching control circuit for outputting signals corresponding to the temperature of the pickup coils, wherein the switching control circuit carries out ON/OFF control of the switching element corresponding to the output signals of the temperature sensor.

A power feeding apparatus according to the third invention is a power feeding apparatus as described in the first invention or the second invention, further comprising a fuse at a connecting node between the pickup coils and the switching control circuit.

A power feeding apparatus according to the fourth invention is a power feeding apparatus as described in the first invention or the second invention, wherein said switching control circuit comprises a communication unit.

A transporter according to the fifth invention is a transporter equipped with any one of the power feeding apparatuses described in the first invention through the fourth invention, and is driven by the electric power supplied by the power feeding apparatus.

A transport system according to the sixth invention comprises a feeder line connected to an electric power source for generating the induced electromotive force on the pickup coils, and a transporter described in the fifth invention.

In the power feeding apparatus according to the first invention, when an overvoltage exceeding a predetermined value has occurred at the both ends of the pickup coils due to a short circuit or the like of a load, the switching element is made to become into a discontinuous state by the switching control circuit, and it is possible to prevent any overvoltage from flowing through the load without stopping the electric power source. Further, it is possible to prevent the circuit elements from being destroyed or burnt out due to an overcurrent generated on the pickup coils or an overvoltage generated in the resonance capacitor. Furthermore, it is possible to make the switching element to become into a discontinuous state without any delay at an occurrence of instantaneous overvoltage.

Still further, even when the switching element has become into a discontinuous state at an occurrence of an abnormality, it is possible that the switching control circuit make the power feeding apparatus itself to maintain the indication of the abnormality and to maintain the switching element in discontinuous state.

In the power feeding apparatus according to the second invention, even when the voltage generated in the pickup coils is lower than the predetermined value, but when the temperature of the pickup coils exceeds the predetermined value due to a temperature rise around the pickup coils or an increase of current or the like, the switching element becomes into a discontinuous state to prevent the circuit elements from being destroyed or burnt out.

In the power feeding apparatus according to the third invention, even when an abnormality has occurred in the switching control circuit, and the switching element has become into uncontrollable and an overcurrent flows, the fuse is opened to prevent the circuit elements from being destroyed or burnt out due to an applied overcurrent or overvoltage.

In the power feeding apparatus according to the fourth invention, it is possible to control the switching element by means of a remote control. Accordingly, it is possible to eliminate a danger and troublesomeness accompanying the releasing service of the switching element at a position where the power feeding apparatus in which the abnormality has occurred is installed, and to eliminate a danger or the like of a service person due to automatic resetting of the switching element.

In the transporter according to the fifth invention, it is possible to respond to an abnormality occurred while the electric power is supplied and to provide a stable drive.

In the transport system according to the sixth invention, it is possible to provide a stable drive and effective transportation of goods.

The above and further objects and features of the invention will more fully be apparent from the following detailed description with accompanying drawings.

DETAILED DESCRIPTION OF THE INVENTION

Figure 1:
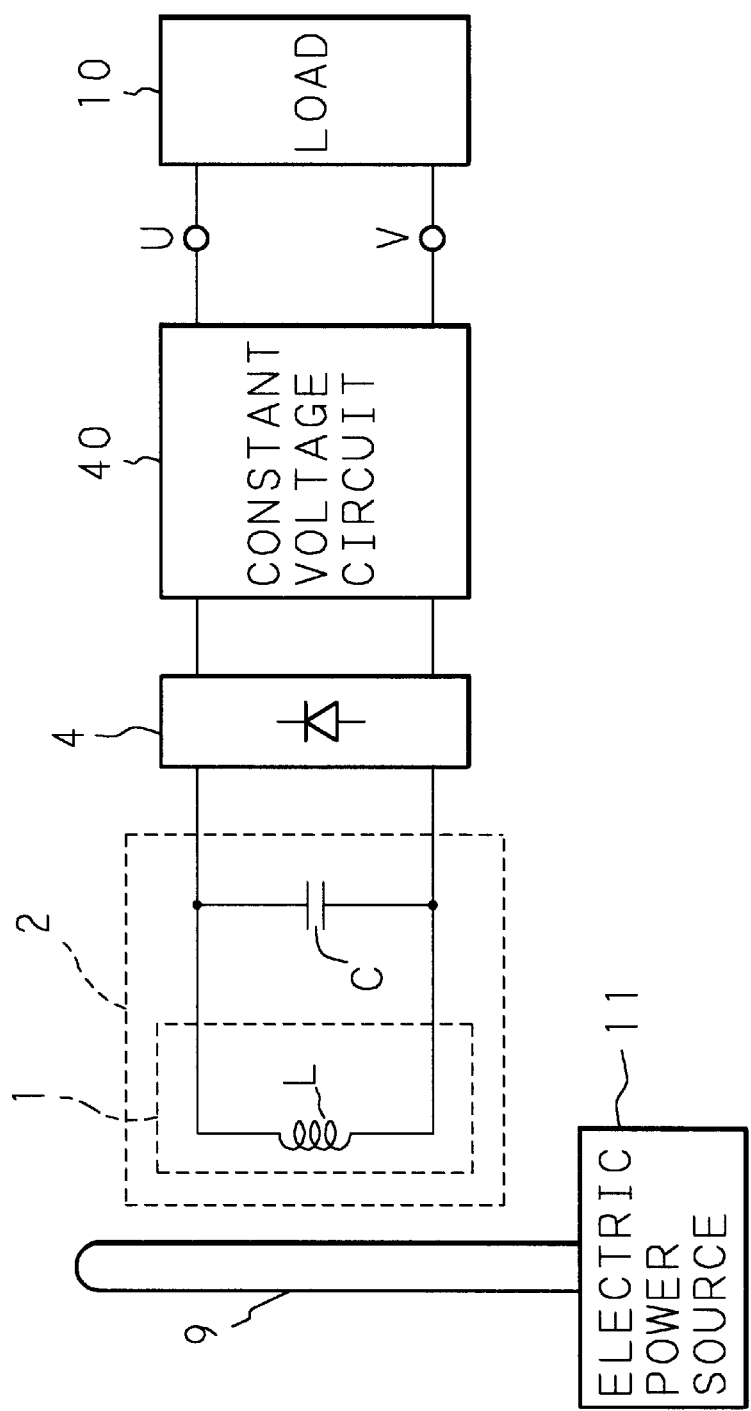
FIG. 1 is a block diagram showing a conventional non-contacting type power feeding apparatus.
Figure 2:
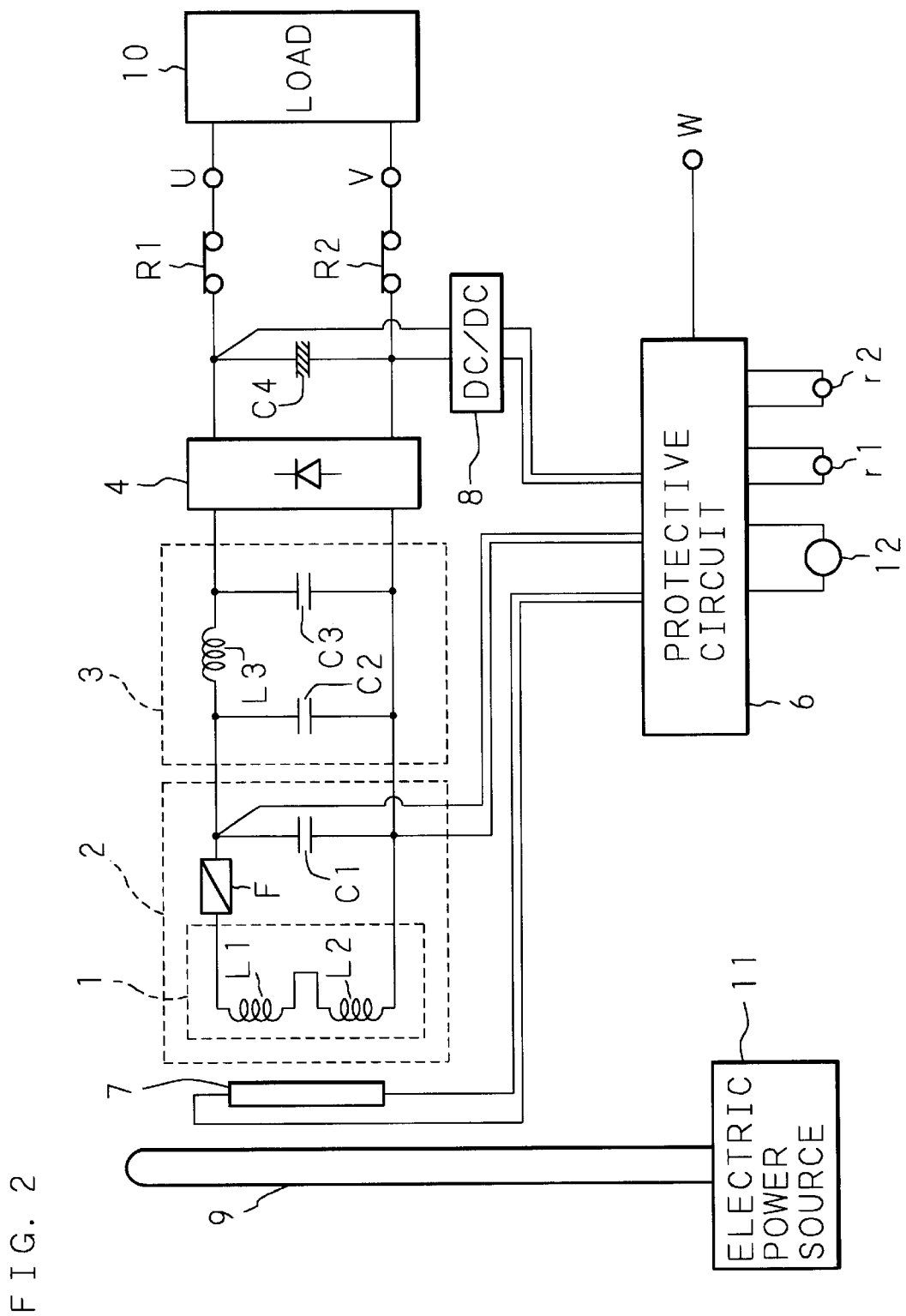
FIG. 2 is a block diagram showing an embodiment of a non-contacting type power feeding apparatus according to the present invention.
Figure 3:
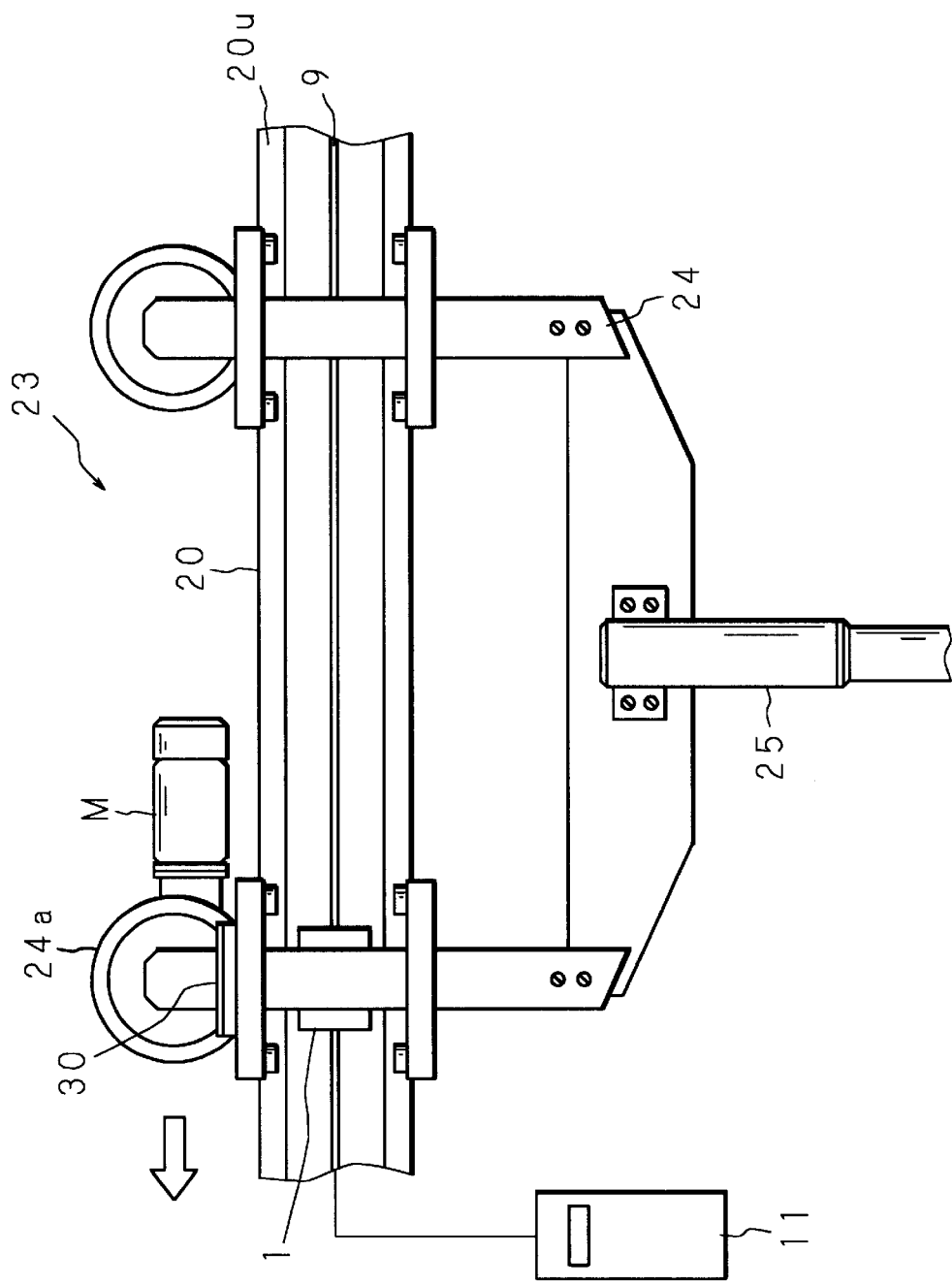
FIG. 3 is a schematic side view showing the structure of a transporter equipped with the non-contacting type power feeding apparatus in which the power feeding apparatus according to the present invention is used.

FIG. 2 is a block diagram showing an embodiment of a non-contacting type power feeding apparatus according to the present invention. FIG. 3 is a schematic side view showing the structure of a transporter equipped with the non-contacting type power feeding apparatus.

In the figures, reference numeral 23 denotes a transporter. The transporter 23 is constructed such that a carrier 25 which detachably attaches goods to be transported is suspended from the lower portion of a U-shaped chassis frame 24. At upper portion of the chassis frame 24, a pickup 1 and a motor M are mounted. Along a guide rail 20 having a roughly I-shaped sectional configuration and laid within a plant, a feeder line 9 is attached therealong. Alternating electric power supplied from an electric power source 11 to the feeder line 9 generates the induced electromotive force caused by the electromagnetic coupling on the pickup 1, and the motor M is driven by electric power and the transporter 23 is driven accordingly. A driving wheel 24a provided on the transporter 23 rotatably comes in contact with the upper face of an upper plan portion 20u of the guide rail 20, and the transporter 23 travels along the guide rail 20.

The pickup 1 is comprised of pickup coils L1 and L2 wound around a pickup core (not shown) respectively. A resonance capacitor C1 is connected in parallel to the pickup coils L1 and L2. A resonance circuit 2 is comprised of the pickup coils L1 and L2 and the resonance capacitor C1. Further, a fuse F is connected in series between the pickup coil L1 and the connecting node to which the resonance capacitor C1.

To the resonance capacitor 1, a capacitor C2 is connected in parallel, and a coil L3 and a capacitor C3 connected in series are connected in parallel. A η-type (C-L-C type) immittance conversion circuit 3 is comprised of the capacitors C2, C3 and the coil L3. The common connecting node of the capacitor C3 and the coil L3, and the common connecting node of the capacitor C2 and the capacitor C3 are the connecting nodes, respectively, with the input-side terminals of a rectifier circuit 4. A capacitor C4 is connected in parallel to the output side terminals of the rectifier circuit 4, and one terminal of each relay of R1 and R2, which are the switching elements, is connected to the output side terminals thereof respectively. The other terminals of each relay R1 and R2 becomes the output terminals U and V, respectively, of the non-contacting type power feeding apparatus and connected to the load 10 such as the motor M of the transporter 23.

A temperature sensor 7 that has contacts positioned at the both ends of the resonance capacitor C1 and adjacent to the pickup coils L1 and L2 is connected to a protective circuit (switching control circuit) 6. The protective circuit 6 is connected to each relay coil r1 and r2 of the relays R1 and R2, and is provided with an antenna W comprising a communication unit and an alarm 12, and is supplied with the electric power from the output side terminals of the rectifier circuit 4 via a DC/DC converter 8. The temperature sensor 7 is positioned adjacent to the pickup coils L1 and L2 and, in order to reduce the influence of the magnetic field, disposed at right angles to the magnetic field generated on the pickup cores, and a non-metallic temperature sensor such as a thermo-sensitive ferrite or a thermistor is used. In the non-contacting type power feeding apparatus, the circuit portion excluding the pickup 1 is contained within a circuit box 30 provided to the upper portion of the chassis frame 24 of the transporter 23.

Figure 4:
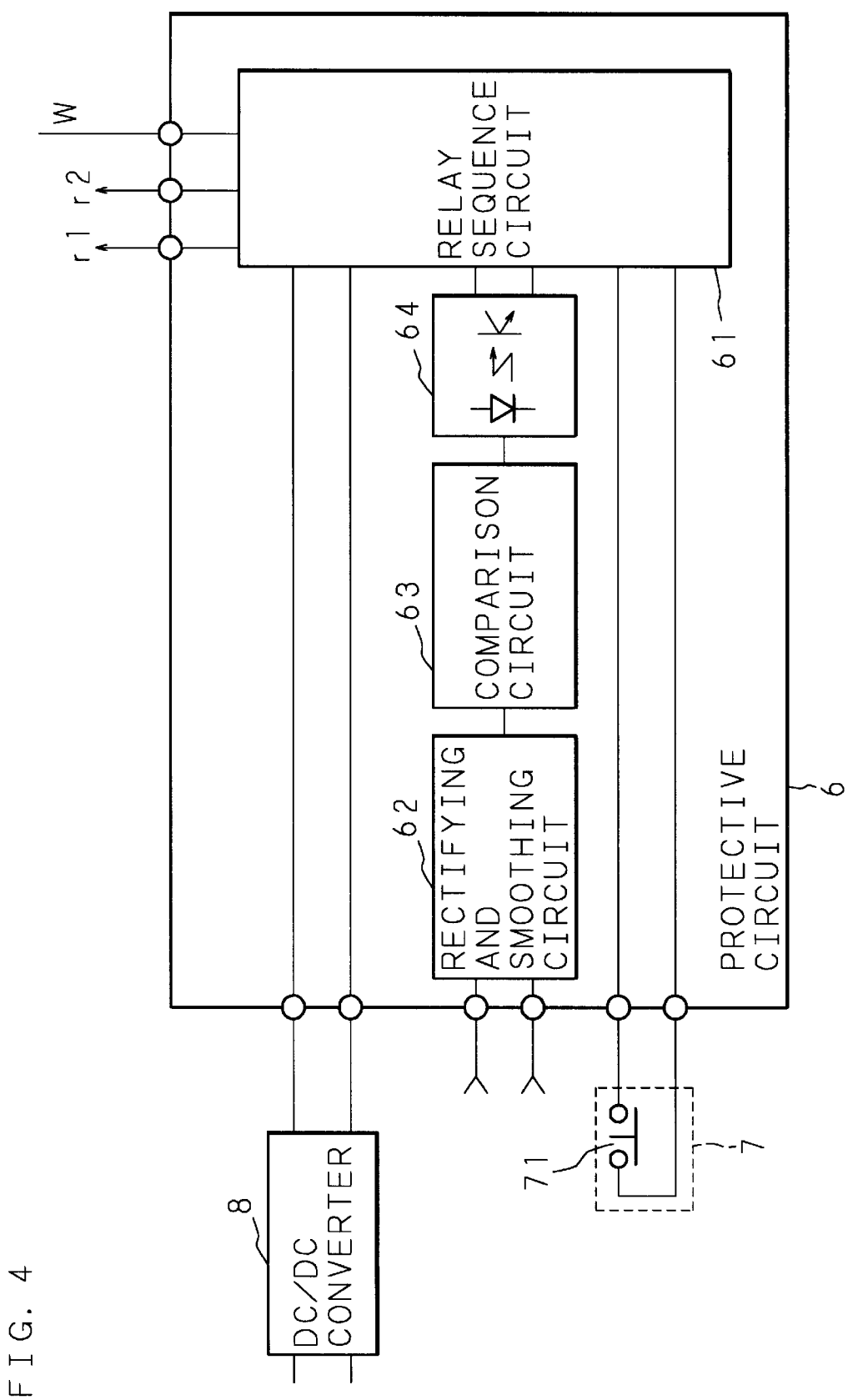
FIG. 4 is a block diagram showing the structure of a protective circuit (switching control circuit) provided to the non-contacting type power feeding apparatus which uses the power feeding apparatus according to the present invention.

FIG. 4 is a block diagram showing the structure of the protective circuit 6 provided to the non-contacting type power feeding apparatus that uses the power feeding apparatus according to the invention. The voltage generated at the both ends of the resonance capacitor C1 is converted into DC voltage and smoothed by a rectifying and smoothing circuit 62 comprising the protective circuit 6, and compared with a threshold voltage by a comparison circuit 63 such as a comparator. Since a photocoupler 64 is interposed between the comparison circuit 63 and a relay sequence circuit 61, the output signals of the comparison circuit 63 are transmitted while being isolated to the relay sequence circuit 61, converted into control signals for carrying out ON/OFF control of the relays R1 and R2 and inputted to the relay coils r1 and r2.

The temperature sensor 7 detects the voltage signals corresponding to the temperature of the pickup coils L1 and L2 and input them to the relay sequence circuit 61. Further, the temperature sensor 7 is provided with a contact 71, and the contact 71 carries out contacting operation corresponding to the temperature of the pickup coils L1 and L2. That is to say, when the temperature of the pickup coils L1 and L2 is lower than the threshold value, the contact 71 closes the circuit (ON), and when it is higher than the threshold value, the contact 71 opens the circuit (OFF). The voltage signals are converted into the control signals for carrying out ON/OFF control of the relays R1 and R2 and inputted into the relay coils r1 and r2.

Hereinafter, a description will be made as to the operation of the non-contacting type power feeding apparatus structured as described above.

When the AC electric power having a constant current characteristic is supplied to the feeder line 9 connected to the electric power source 11, an induced electromotive force having a constant current characteristic is generated on the pickup coils L1 and L2 of the pickup 1. The induced electromotive force is resonated in the resonance circuit 2 and its voltage is increased, at the same time, reactive power elements are removed, and the constant current characteristic is converted into constant voltage characteristic by the immittance conversion circuit 3. Further, the electric power is rectified by the rectifier circuit 4 and smoothed by the capacitor C4, and outputted from the output terminals U and V via the relays R1 and R2 in the closed circuit state. When the electric power is supplied to the load 10 such as the motor M or the like of the transporter 23, the transporter 23 is driven.

Whereas, the protective circuit 6 is supplied with electric power from the output side terminal of the rectifier circuit 4 via the DC/DC converter 8, and receives the signals corresponding to the voltage generated at the both ends of the resonance capacitor C1 and the signals corresponding to the temperature of the pickup coils L1 and L2 detected by the temperature sensor 7.

When an abnormality such as a short circuit or the like occurs in an built-in circuit of the load 10, since the state is the identical as a state in which the output terminals U and V of the non-contacting type power feeding apparatus are short circuited, an overcurrent flows through the pickup coils L1 and L2, and overvoltage is generated in the resonance capacitor C1. When the voltage generated in the resonance capacitor C1 exceeds the threshold value, the relays R1 and R2 are shut down (elesed open circuit) by the protective circuit 6, at the same time the alarm 12 is activated. Also, even when the voltage generated in the resonance capacitor C1 is lower than the threshold value, but when the temperature around the pickup coils L1 and L2 increases, or the temperature of the pickup coils L1 and L2 increases due to an increase of the electric power or the like, and when the temperature detected by the temperature sensor 7 exceeds the threshold value, the relays R1 and R2 are shut down by the protective circuit 6, and at the same time the alarm 12 is activated.

In the non-contacting type power feeding apparatus as described above, when the relays R1 and R2 are shut down, although the output electric power of the non-contacting type power feeding apparatus becomes zero, because the protective circuit 6 can receive electric power from the output side terminals of the rectifier circuit 4 via the DC/DC converter 8, it is possible to maintain the state in which the relays R1 and R2 are shut down and the alarm 12 is activated.

While the state under which the relays R1 and R2 are shut down is maintained, a necessary measures such as an inspection and repair service or the like of the abnormality occurred on the load 10 of the transporter or the like will be taken. And after that, an instruction signals to make the relays R1 and R2 to close are sent to the protective circuit 6 from the outside via the antenna W. The protective circuit 6 controls the relays R1 and R2 to close in accordance with the instruction signals, and the load 10 of the transporter or the like is supplied with electric power from the non-contacting type power feeding apparatus and driven again.

Furthermore, in case an abnormality has occurred on any one of the immittance conversion circuit 3, rectifier circuit 4, relays R1 and R2 or protective circuit 6, and the relays R1 and R2 have become uncontrollable, and furthermore an overcurrent has flowed through the pickup coils L1 and L2, the fuse F is opened and the electric power supplied by the non-contacting type power feeding apparatus in which the abnormality has occurred is stopped forcedly.

As for the immittance conversion circuit 3, in addition to the type shown in FIG. 2, any type of immittance conversion circuit from η-type (L-C-L type), T-type (C-L-C type), T-type (L-C-L type), and cross-type may be used. Further, in place of the immittance conversion circuit, a constant-voltage circuit may be used. In the protective circuit 6 according to the embodiment of the invention, in order to control the voltage at both ends of the resonance capacitor C1 and the temperature of the pickup coils L1 and L2, the relays R1 and R2 are controlled. In addition, in order to control each of the current of the resonance capacitor C1, the current of the pickup coils L1 and L2, the output current of the immittance conversion circuit 3 and the DC output current of the rectifier circuit 4, using a value detected by a current transformer or a shunt resistance, or a value detected using the voltage at the both ends of the coil L3, or a value of the magnetic flux density detected using the search coil, the relays R1 and R2 may be controlled. Still further, as for switching element, in addition to the relays, a transistor or thyrister may be used.

Figure 5:
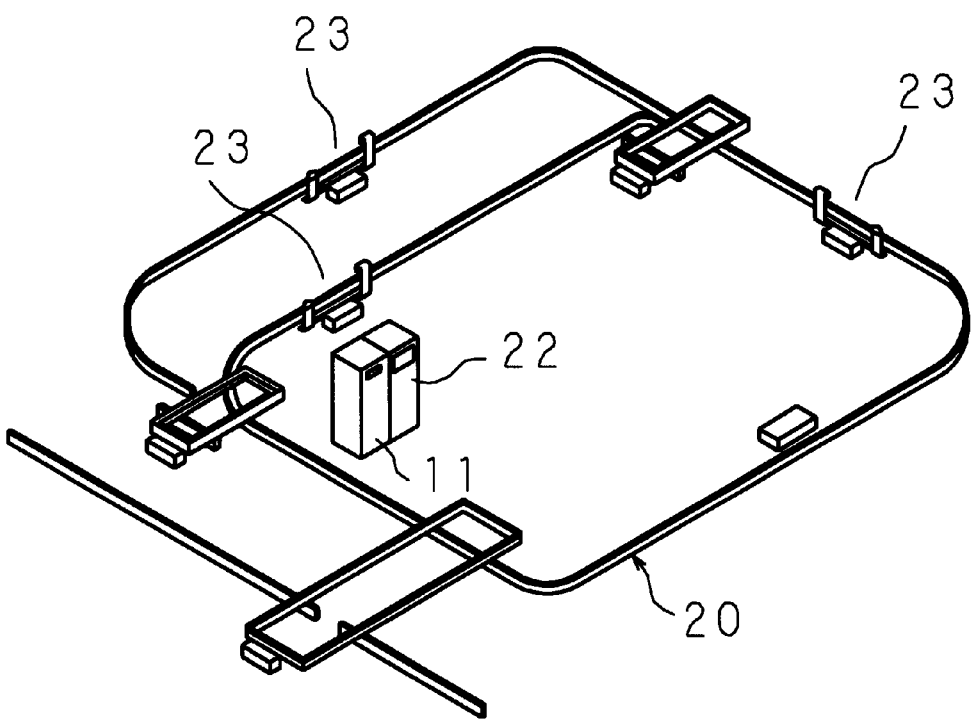
FIG. 5 is a schematic perspective view showing a transport system equipped with the non-contacting type power feeding apparatus in which the power feeding apparatus according to the present invention is used.

FIG. 5 is a schematic perspective view showing a transport system equipped with the non-contacting type power feeding apparatus in which the power feeding apparatus according to the invention is used. In the transport system, the feeder line (refer to FIG. 3) is attached along the guide rail 20 laid in a plant and connected to the electric power source 11. A plurality of the transporters 23 shown in FIG. 5 is hung to the guide rail 20, and controlled by the system controller 22 and driven to carry the goods to be transported. As described in the non-contacting type power feeding apparatus shown in FIG. 2, when an abnormality such as an open circuit of the non-contacting type power feeding apparatus or a short circuit of the transporter 23 or the like has occurred while the transporter 23 is driven, the electric power supply is stopped by the protective circuit 6 provided to the non-contacting type power feeding apparatus, and the alarm 12 is activated to alert to the occurrence of the abnormality.

The power feeding apparatus according to the first invention enables the switching element to become into a discontinuous state to prevent any overvoltage from flowing through the load without stopping the electric power source, when an overvoltage exceeding a predetermined value has generated at the both ends of the pickup coils due to a short circuit of the load or the like. Further, the power feeding apparatus according to the first invention enables to prevent the circuit elements from being destroyed or burnt out due to an overcurrent generated in the pickup coils or an overvoltage generated in the resonance capacitor. Furthermore, the power feeding apparatus according to the first invention enables to make the switching element to become into a discontinuous state without any delay at an occurrence of instantaneous overvoltage. Still further, even when an abnormality has occurred, the power feeding apparatus according to the first invention enables the power feeding apparatus itself to indicate an alarm of the abnormality.

The power feeding apparatus according to the second invention enables to make the switching element to become into a discontinuous state to prevent the circuit elements from being destroyed or burnt out even when the voltage generated at the both ends of the pickup coils is lower than the above-mentioned predetermined value, but when the temperature of the pickup coils exceeds the predetermined value due to a temperature rise around the pickup coils or an increase of current or the like.

The power feeding apparatus according to the third invention enables to make the fuse open to prevent the circuit elements from being destroyed or burnt out due to an applied overcurrent or overvoltage, even when an abnormality has occurred in the switching control circuit, the switching element has become into uncontrollable and an overcurrent has flowed.

The power feeding apparatus according to the fourth invention enables to control the switching element by means of a remote control resulting in elimination of a danger and troublesomeness accompanying the releasing service of the switching element carried out at a position where the power feeding apparatus in which the abnormality has occurred is installed, and elimination of danger of a service person due to automatic resetting of the switching element.

The transporter according to the fifth invention enables to respond to an abnormality occurred while the electric power is supplied and to provide a stable drive.

The transport system according to the sixth invention enables to provide a stable drive and effective transportation of objects.

As this invention may be implemented in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power feeding apparatus, comprising: p1 a resonance circuit which includes pickup coils for generating induced electromotive force, and a capacitor;
    a rectifier circuit for rectifying the induced electromotive force generated on said resonance circuit;
    an output terminal for outputting the output electric power from said rectifier circuit;
    an immittance conversion circuit connected between said resonance circuit and said rectifier circuit;
    at least one switching element for electrically connecting and disconnecting said output terminal and a terminal at an output side of said rectifier circuit; and
    a switching control circuit connected to said pickup coils which detects the output voltage of said resonance circuit and carries out ON/OFF control of said at least one switching element corresponding to the detected voltage.

2. The power feeding apparatus as set forth in claim 1, further comprising a fuse at a connecting node between said pickup coils and said switching control circuit.

3. The power feeding apparatus as set forth in claim 1, wherein said switching control circuit comprises a communication unit.

4. The power feeding apparatus as set forth in claim 1, further comprising a temperature sensor connected to said switching control circuit for outputting signals corresponding to the temperature of said pickup coils, wherein said switching control circuit carries out ON/OFF control of said at least one switching element corresponding to the output signals of said temperature sensor.

5. The power feeding apparatus as set forth in claim 4, further comprising a fuse at a connecting node between said pickup coils and said switching control circuit.

6. The power feeding apparatus as set forth in claim 4, wherein said switching control circuit comprises a communication unit.

7. A transporter, comprising a power feeding apparatus as set forth in claim 1, and driven by the electric power supplied by said power feeding apparatus.

8. The transporter as set forth in claim 7, further comprising a fuse at a connecting node between said pickup coils and said switching control circuit.

9. The transporter as set forth in claim 7, wherein said switching control circuit comprises a communication unit.

10. The transporter as set forth in claim 7, further comprising a temperature sensor connected to said switching control circuit for outputting signals corresponding to the temperature of said pickup coils, wherein said switching control circuit carries out ON/OFF control of said at least one switching element corresponding to the output signals of said temperature sensor.

11. The transporter as set forth in claim 10, further comprising a fuse at a connecting node between said pickup coils and said switching control circuit.

12. The transporter as set forth in claim 10, wherein said switching control circuit comprises a communication unit.

13. A transport system, comprising:
    a feeder line connected to an electric power source for generating induced electromotive force on a pickup; and
    a transporter including a power feeding apparatus as set forth in claim 1, and driven by the electric power supplied by said power feeding apparatus.

14. The transport system as set forth in claim 13, further comprising a fuse at a connecting node between said pickup coils and said switching control circuit.

15. The transport system as set forth in claim 13, wherein said switching control circuit comprises a communication unit.

16. The transport system as set forth in claim 13, further comprising a temperature sensor connected to said switching control circuit for outputting signals corresponding to the temperature of said pickup coils, wherein said switching control circuit carries out ON/OFF control of said switching element corresponding to the output signals of said temperature sensor.

17. The transport system as set forth in claim 16, further comprising a fuse at a connecting node between said pickup coils and said switching control circuit.

18. The transport system as set forth in claim 16, wherein said switching control circuit comprises a communication unit.

19. A power feeding apparatus, comprising:
    a resonance circuit which includes pickup coils for generating induced electromotive force;
    a rectifier circuit for rectifying the induced electromotive force generated on said resonance circuit;
    an output terminal for outputting the output electric power from said rectifier circuit;
    a constant-voltage circuit connected between said resonance circuit and said rectifier circuit;
    a plurality of switching elements for electrically connecting and disconnecting said output terminal and a terminal at an output side of said rectifier circuit; and
    a switching control circuit connected to said pickup coils which detects the output voltage of said resonance circuit and carries out ON/OFF control of said plurality of switching elements corresponding to the detected voltage.

* * * * *